United States Patent [19]

Rodriguez et al.

[11] Patent Number: 5,384,598
[45] Date of Patent: Jan. 24, 1995

[54] SYSTEM AND METHOD FOR FRAME DIFFERENCING VIDEO COMPRESSION AND DECOMPRESSION WITH FRAME RATE SCALABILITY

[75] Inventors: Arturo A. Rodriguez, Belmont, Calif.; Charles T. Rutherfoord, Delray Beach, Fla.; Steven M. Hancock; Robert F. Kantner, Jr., both of Boca Raton, Fla.; Mark A. Pietras, Boynton Beach, Fla.

[73] Assignee: International Business Machines Corporation, Armonk, N.Y.

[21] Appl. No.: 963,791

[22] Filed: Oct. 20, 1992

[51] Int. Cl.⁶ .................... H04N 7/130; H04N 7/01
[52] U.S. Cl. .................... 348/384; 348/426; 348/432; 348/439; 348/441
[58] Field of Search .......... 358/133, 135, 136, 102, 358/86; H04N 7/13, 7/12

[56] References Cited

U.S. PATENT DOCUMENTS

| | | | |
|---|---|---|---|
| 4,933,762 | 6/1990 | Guichard et al. | 358/133 |
| 5,134,476 | 7/1992 | Aravind et al. | 358/133 |
| 5,218,431 | 6/1993 | Gleicher et al. | 358/136 |
| 5,231,484 | 7/1993 | Gonzales et al. | 358/133 |

*Primary Examiner*—Tommy P. Chin
*Assistant Examiner*—Vu Le
*Attorney, Agent, or Firm*—Bernard D. Bogdon; Paul W. O'Malley; Andrew J. Dillon

[57] ABSTRACT

A system and method of compressing original video data expressed in a plurality of digitally coded frames which enable decompression and playback of resulting compressed video data at one of a plurality of frame rates while maintaining temporal fidelity of the frames displayed. Compression includes selecting a plurality of rate streams for the compressed video data, including a highest rate stream including all of the frames of the original video data and a lowest rate stream including a subset of regularly spaced frames of the original video data. Then the initial frame in the original video data is spatially compressed and the resulting compressed data placed in the compressed video data. The initial frame is also saved as a base frame for all rate streams for subsequent temporal compression of the original video data. As frames are retrieved from the original video data in sequence, temporal compression based on frame differencing techniques between the retrieved frame and the base is carried out, with difference frames being stored to the compressed video data. Each difference frame is placed in the resulting compressed video data for later decompression and reproduction.

25 Claims, 8 Drawing Sheets

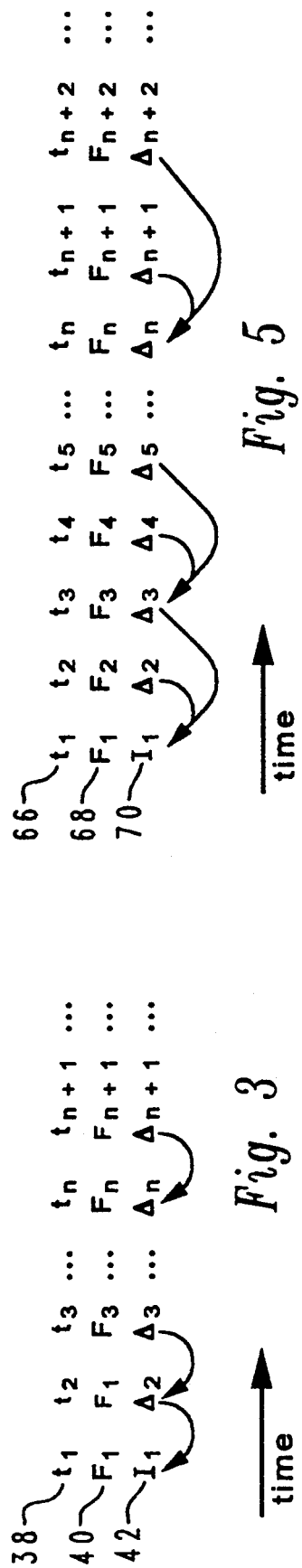
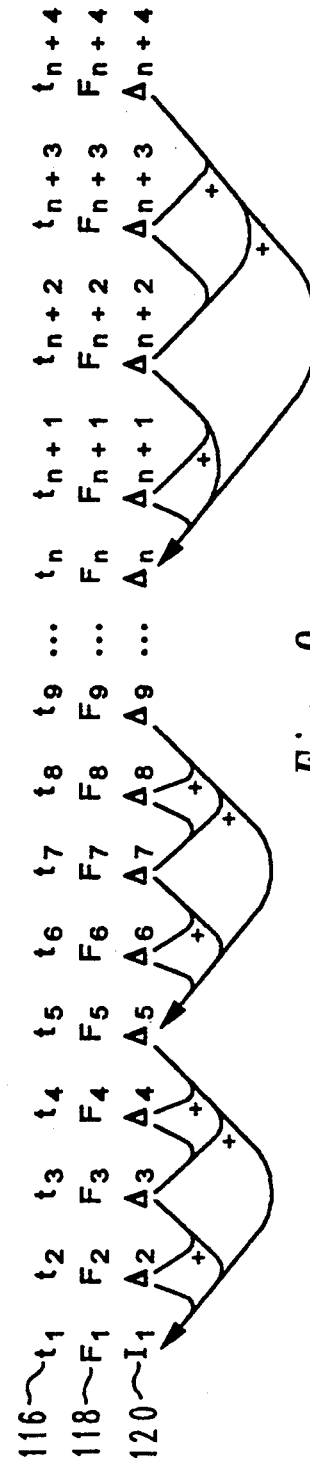
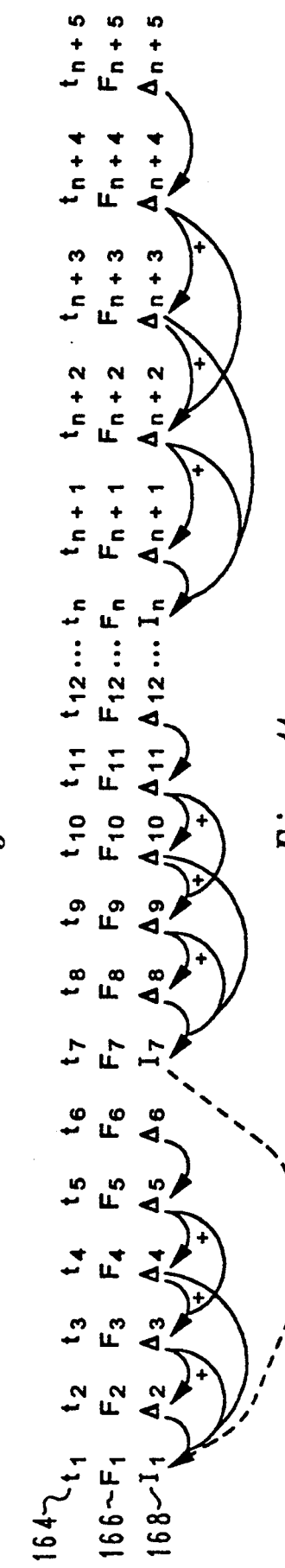

SYSTEM AND METHOD FOR FRAME DIFFERENCING VIDEO COMPRESSION AND DECOMPRESSION WITH FRAME RATE SCALABILITY

BACKGROUND OF THE INVENTION

1. Technical Field

The invention relates to the compression for storage and decompression for playback of video segments in a data processing system. More particularly, the invention relates to a system and a method of compressing video information in such a way that the playback platform can select a frame rate for playback in real time, thus allowing portability of video segments between machines of differing processing capacity. Still more particularly, the invention relates to a system and method for providing random access to the compressed video signal while allowing frame rate scalability.

2. Description of the Related Art

A video signal comprises a sequence of frames, which when displayed at a given minimum frame rate (e.g., 15 to 30 frames-per-second in a personal computer), simulate the appearance of motion to a human observer. In a personal computer system, each frame of the video image comprises a matrix of picture elements or "pixels." A typical matrix may have 320 columns by 240 rows of pixels. A pixel is the minimum unit of the picture which may be assigned a luminance intensity, and in color video, a color. Depending upon the data format used, as many as three bytes of data can be used to define visual information for a pixel. A complete color description of all pixels for an entire frame can require over two hundred thousand bytes of data.

For a video segment, if full frames were replaced at a frame rate of 30 frames per second, a computer could be required to recover from storage and write to video memory as much as 27 million bytes of data each second. Few contemporary mass data storage devices have both the bandwidth required to pass such quantities of data or the storage capacity to hold more than a few minutes worth of digital video information directly stored. As used here, bandwidth means the volume of data per unit time which can be recovered from an auxiliary storage device. Data compression is used to accommodate auxiliary storage devices in the storage and recovery of video segments for playback in real time and to reduce traffic on the system bus.

Data compression allows an image or video segment to be transmitted and stored in substantially fewer bytes of data than required for full frame reproduction. Data compression can be based on eliminating redundant information from frame to frame in a digitized video segment (temporal compression), or by eliminating redundant information from pixel to pixel in individual frames (spatial compression). These techniques can be implemented in a loss less or lossy manner. In addition, compression may exploit superior human perception of luminance intensity detail over color detail by averaging color over a block of pixels while preserving luminance detail. This is an example of a lossy compression technique.

Frame differencing compression methods exploit the temporal redundancy that exists between digital video frames from the same scene recorded moments apart in time. This reduces the required data needed to encode each frame. Two successive frames from a sequence of digital motion video frames are compared region by region. The comparison process determines whether two corresponding regions are the same or different. The size and location of each region, the exact nature of the comparison and the definition of same and different in terms of the threshold supplied are outside the scope of this invention.

Necessarily, one frame represents a point in time after another frame. If two regions being compared are the same, then the pixels in the regions from frame N do not need to be encoded and stored if the pixels in a frame N-1 are already known. When two regions are different, the pixels in the later frame must be encoded and stored. When each region of two frames have been compared, encoded and stored, the process moves to the next pair of frames. During playback, the decompression process adds the stored information for each period to the current state of the display memory using a process that is the logical reverse of the encoding process. This is called conditional replenishment.

When there is very little temporal redundancy in a digital motion video the method fails. However, a motion video sequence of a flower growing, shot at 30 frames per second, will contain a great deal of redundancy and will compress well using conditional replenishment. Similarly a sequence recorded through a moving camera will contain little redundancy and not compress well, assuming prior art motion compensation algorithms are not employed.

While compression makes it possible to store and reproduce video segments on personal computers, the quantities of data involved and the computational load imposed on system central processor still tax the capacity of many contemporary personal computers, particularly low end machines based on the Intel 8086/88 family of microprocessors. Large capacity machines designed for multitasking of applications and having advanced video adaptors have an easier time handling video segments until several tasks are applied to them, including demands that two or more video segments be simultaneously reproduced. It is critical to the presentation of video segments that such presentation be in real time. In the past, frame rates for a video segment have been selected with a particular playback platform in mind. To reproduce video on an 8086/88 based machine running at 10 Mhz, a frame rate of 5 or 6 fps might be the fastest rate supported. Higher capacity machines would be given versions of the video segment for reproduction at 30 fps. The two compressed sequences have not been portable between the machines because of the requirement that each frame be decompressed in sequence. Playback of the 30 fps sequence on an 8086/88 machine results in a slow motion display. While a 5 fps sequence can be reproduced on a higher capacity machine in real time, the reproduced images show no improvement in smoothness over the lower capacity machines.

SUMMARY OF THE INVENTION

The invention provides a system and method of compressing original video data expressed in a plurality of digitally coded frames. The system and method enable decompression and playback of resulting compressed video data at one of a plurality of frame rates while maintaining temporal fidelity of the frames displayed. Compression includes selecting a plurality of rate streams for the compressed video data, including a highest rate stream including all of the frames of the original video data and a lowest rate stream including a subset of regularly spaced frames of the original video data. Then the initial frame in the original video data is spatially compressed and the resulting compressed data placed in the compressed video data. The initial frame is also saved as a base frame for all rate streams for subsequent temporal compression of the original video data. As frames are retrieved from the original video data in sequence, temporal compression based on frame comparison techniques between the retrieved frame and the base is carried out, with difference frames being stored to the compressed video data. Each difference frame is placed in the resulting compressed video data for later decompression and reproduction.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a schematic illustration of a video compression process in accord with the prior art;

FIG. 5 is a schematic illustration of a video compression process in accord with the process of FIG. 4;

FIG. 8 is a schematic illustration of a video compression process in accord with the process of FIG. 7;

FIG. 11 is a schematic illustration of a video compression process in accord with the process of FIG. 10.

DETAILED DESCRIPTION OF THE INVENTION

Figure 1:
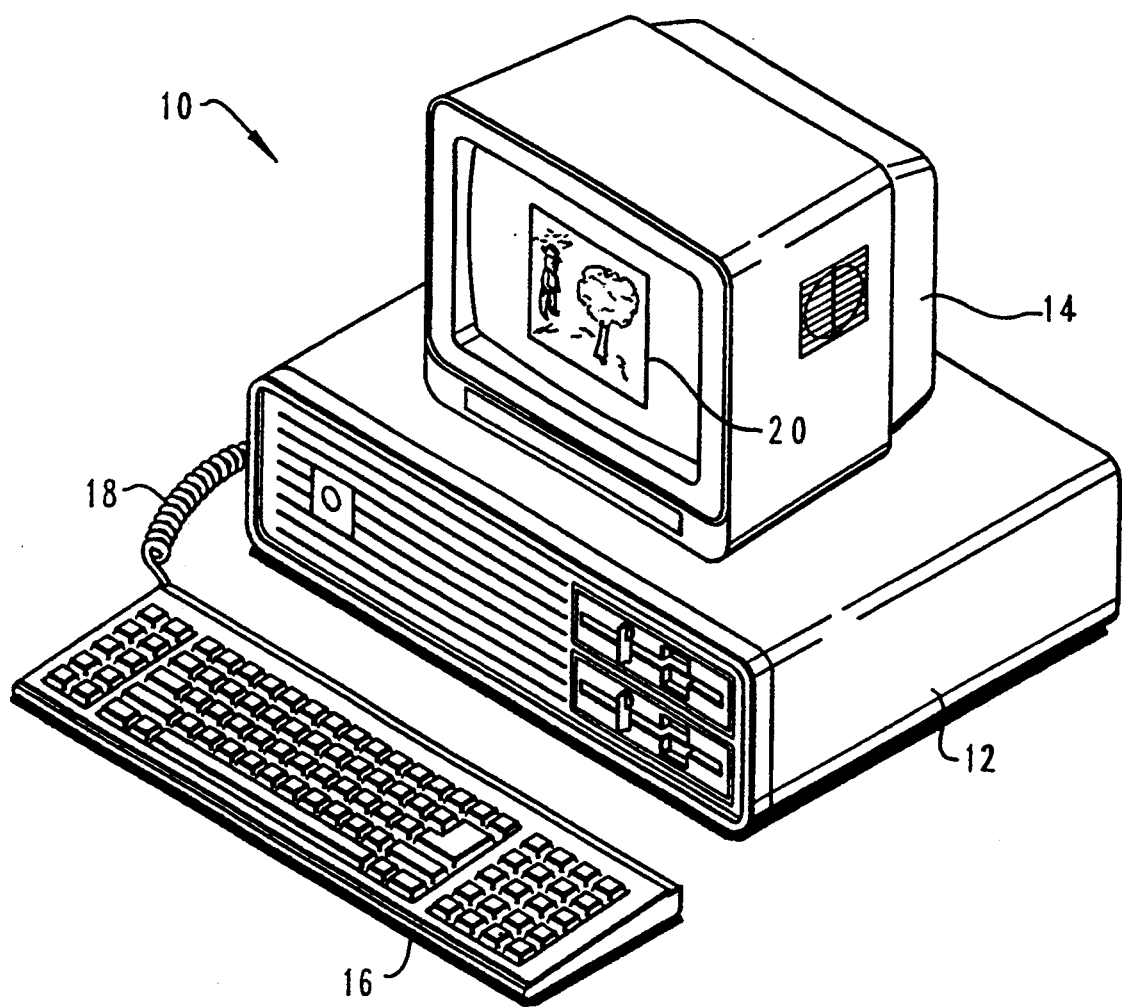
FIG. 1 is a pictorial view of a personal computer.

With reference now to the figures and in particular with reference to FIG. 1, there is depicted a pictorial representation of a personal computer system 10 which may be utilized in accordance with the method of the present invention. Personal computer system 10 includes a computer 12, preferably provided by utilizing an IBM Personal System 2 or similar system. Personal computer system 10 generally includes a video display 14 and a keyboard 16 connected to the computer by cable 18. Video display device 14 and keyboard 16 are utilized to allow user input to computer 12 and to provide user perceivable messages such as video segments 20.

Figure 2:
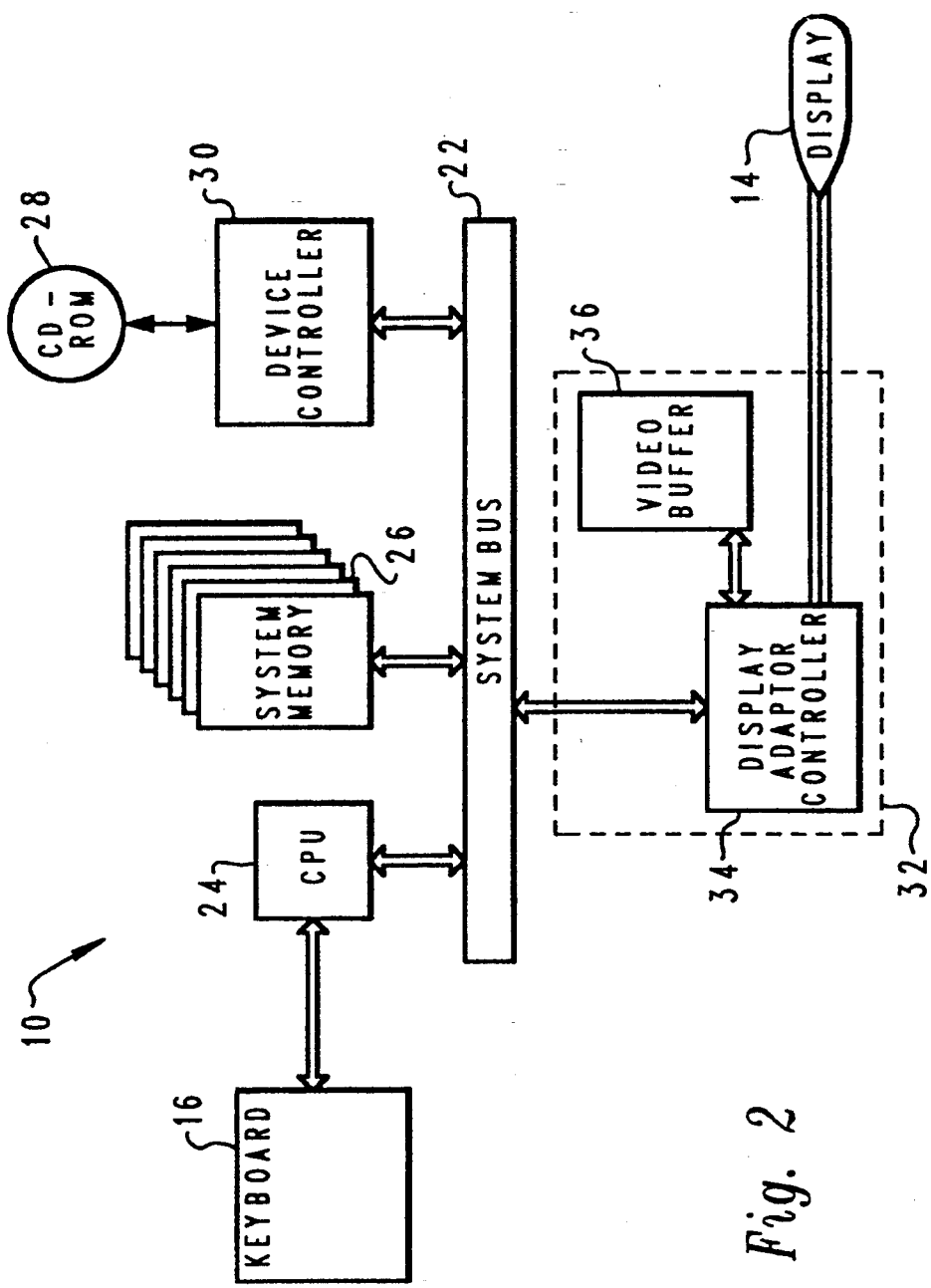
FIG. 2 is a block diagram of a data processing system for reproduction of video segments.

FIG. 2 is a block diagram of personal computer system 10. Computer system 10 is based on a system bus 22 on which data is passed between components of computer system 10. Among components connected to system bus 22 are a central processing unit (CPU) 24, which may be based on an Intel 8086/88 or more powerful microprocessor. CPU 24 executes programs stored in system memory 26 and manipulates data stored in system memory 26. A video segment may be stored in a compressed form on a compact disc-read only memory (CD-ROM) 28 which is accessed by CPU 24 through a device controller 30 connected to system bus 22. Depending upon the capability of the computer system, frames of a video segment stored on CD-ROM 28 may be transferred to system memory 26 for decompression by CPU 24 or to video buffer 36 in a display adaptor 32, where the data can be decompressed by a display adaptor controller 34. Depending on the system, video buffer 36 may or may not be available. Low capacity systems lacking such a video buffer require retrieval and decompression of a video segment through CPU 24 and system memory 26. Thus video data may be displayed on display 14 from system memory 26 or out of video buffer 36.

FIG. 3 is a schematic illustration of a classical method for video data compression. A video segment comprises a raw frame sequence 40 corresponding to a time period sequence 38. A compressed difference frame sequence 42 comprises a spatially compressed representation of the first frame of the original video signal and a sequence of difference frames corresponding to each subsequent frame of the original video data 40. The difference frames are accumulative. That is to say that the difference frame corresponding to time period 2, when added to the initial frame, produces data allowing reconstruction of the second frame of the original data. Likewise the difference frame in the third period when added to the sum of the initial frame and the second difference frame allows reconstruction of the third frame of the original video sequence 40. Playback of the compressed video signal 42 requires processing of the compression data for each time period. Difference frame 2 must follow the initial frame and difference frame 3 must follow difference frame 2. Omission of any difference frame results in some incremental distortion of the reproduced picture.

Figure 4:
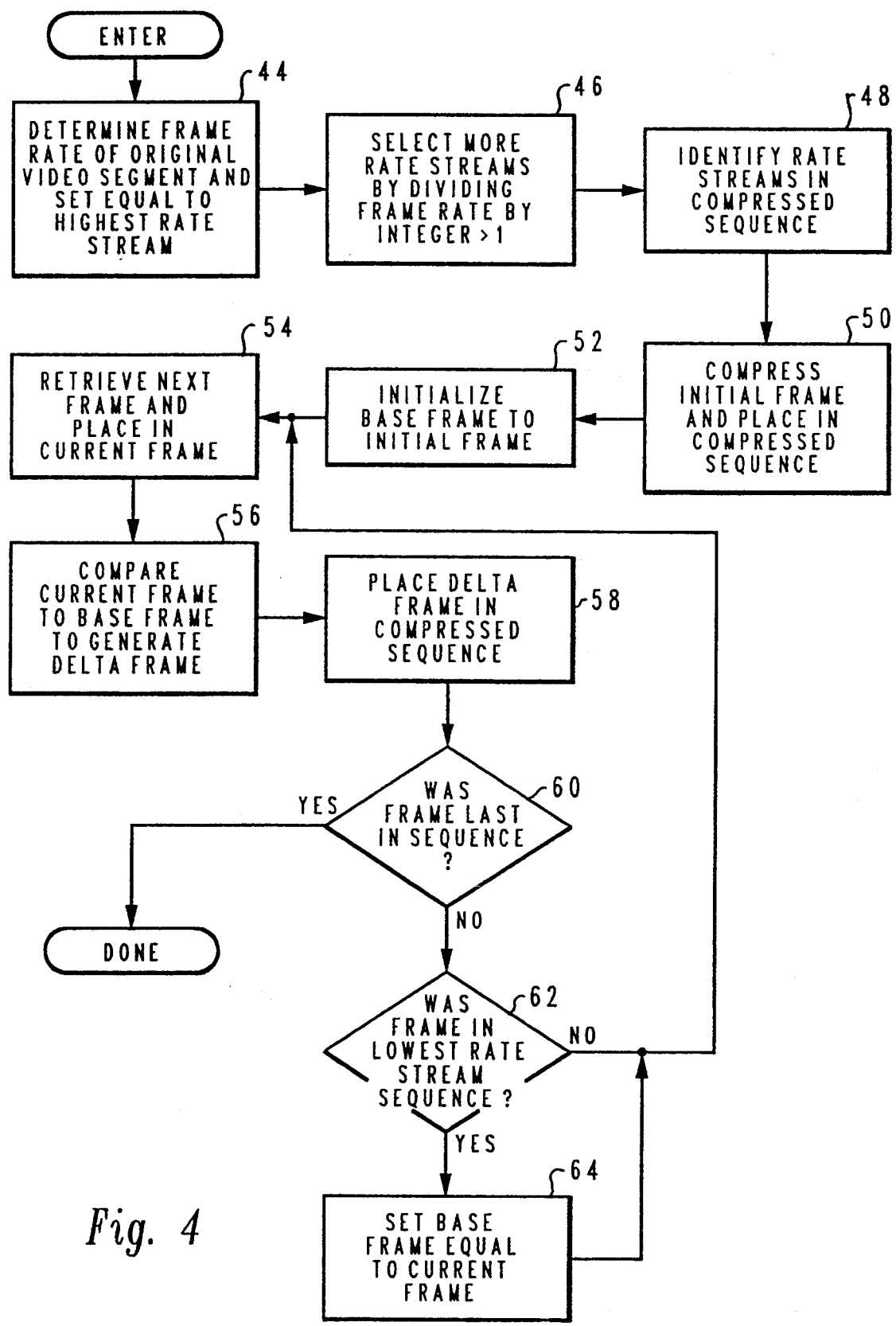
FIG. 4 is a logical flow chart for a process for compressing video data in accordance with a first embodiment of the invention.

FIG. 4 is a logical flowchart of a process for compressing a video segment data allowing decompression and playback of the video segment on personal computers based on Intel 8086/88 type microprocessors but providing frame rate scalability allowing higher quality reproduction of the video segment on machines of greater capability. Higher quality images are provided by increasing the frame rate of reproduction while maintaining the temporal extent of the video segment.

The process of FIG. 4 is a type of temporal compression in which the requirement that a frame be compared to the immediately preceding frame has been relaxed. Although frames separated by large time intervals will have less inherent redundancy, and will compress less than frames adjacent to one another in time, the ability to reproduce the video image at a frame rate within the capability of the playback platform in use is enhanced since the playback platform can then select a feasible frame rate.

The process is entered at step 44 with determination of the frame rate of the original video segment which is then set as the highest rate stream for reproduction. Next, with execution of step 46, additional rate streams are selected by dividing the frame rate of the original video segment by an integer greater than 1. Upon compression of a frame it will be identified with one or more rate streams as placed in the sequence of compressed frames that constitutes the compressed video data.

Next, step 50 is executed to compress the initial frame in the original video segment and to place it in the compressed sequence of frames. In step 52 the initial frame from the video segment is designated as a first base frame for temporal compression.

In step 54 the next following frame in the original video segment is retrieved and designated as the current frame for compression. At step 56 the current frame is compared to the base frame to generate a delta or difference frame. In step 58 the delta frame is placed in the compressed sequence, identified as to its period by its position. At step 60 it is determined if the current frame is the last in the original video segment sequence. If it is the last frame, encoding is completed and the YES branch is taken to exit the process. If it is not the final frame, step 62 is executed to determine if the frame belongs to the lowest rate stream sequence. The lowest rate stream is based on the frame rate intended to be the slowest supported level of frame reproduction on a playback platform. If the frame is not in the lowest rate stream the NO branch is followed back to step 54 to retrieve the next frame for compression. If the frame belongs to the lowest rate stream, the YES branch is followed to step 64 where the base frame is reset to equal the current frame. The process returns to step 54 to retrieve another frame for compression.

FIG. 5 is a schematic illustration of a video compression process in accord with the encoding process of FIG. 4. Again a plurality of time periods 66 have a corresponding frame of video information from a raw sequence 68. A sequence 70 of compressed video information includes an initial frame which represents a spatial compression of the initial frame of sequence 68, and difference frames corresponding to the subsequent time periods which represent changes from the original frame or a later base frame. For example, the frame indicated as F3 is substituted for F1 as the base frame for compression of the frames F4 and F5. Highest quality playback decompresses the initial frame and every difference frame in sequence 70. A lower quality level of playback decompresses the initial frame and every odd numbered difference frame. The two rate streams are indicated by arrows connecting the members of each rate stream. More than two playback period can be supported by a sequence.

While compression of video utilizing the process of FIG. 4 is simple, it requires some system memory overhead on reproduction. Because the decompression process is not sequentially additive, a video buffer cannot be routinely used. For example, in order to properly reconstruct the second frame (F3) of a two frame comparison, the playback process must hold on to the data associated with the base frame $F_1$, until it has decompressed the second frame in the rate stream. Where only one frame rate is supported, the base frame can be held in the display memory itself, and each delta frame is merely added to the current state of the display memory.

Figure 6:
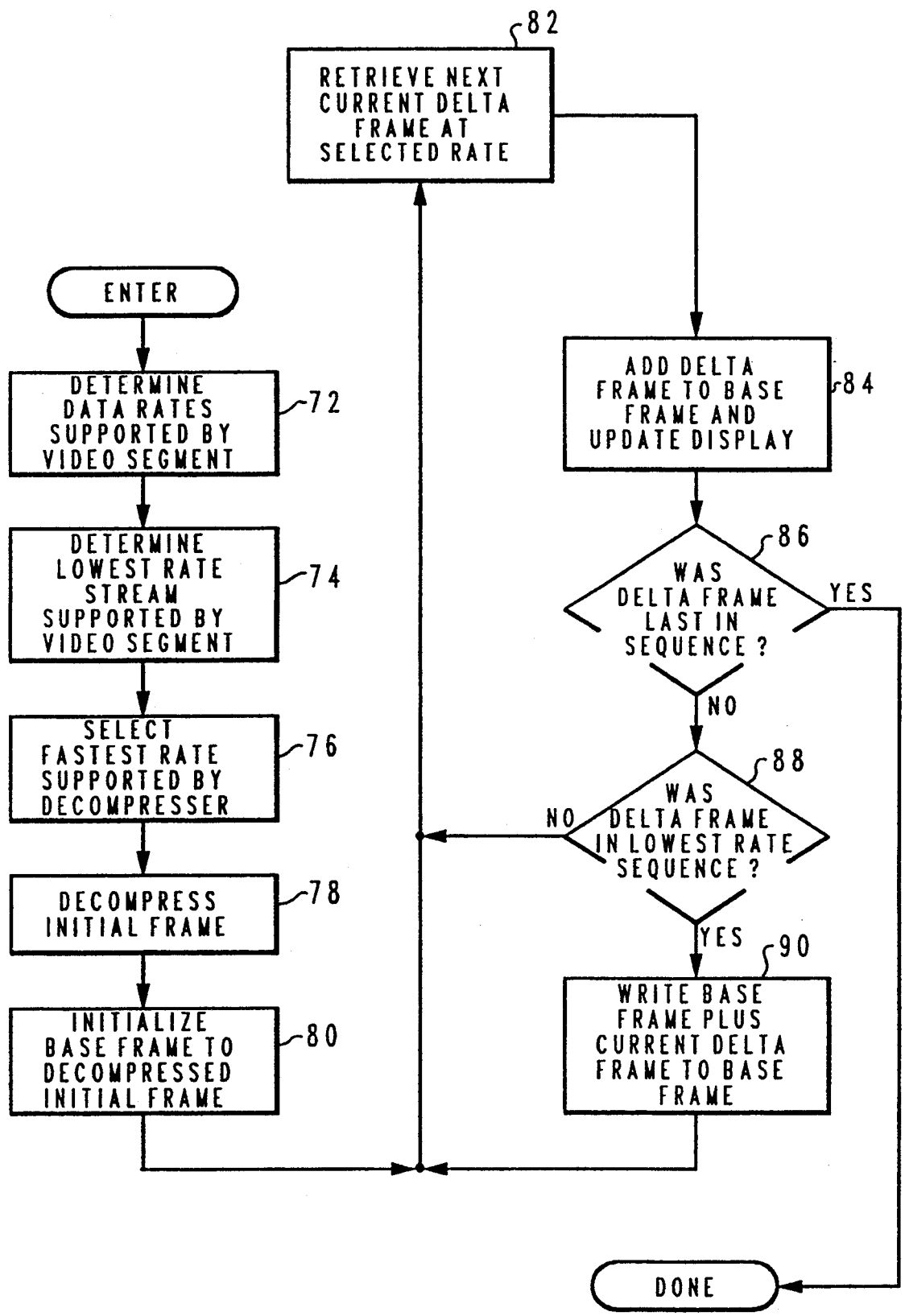
FIG. 6 is a logical flow chart for a process for decompressing video data in accordance with a first embodiment of the invention.

FIG. 6 is a logical flowchart of a process for decompressing video data which was compressed in accordance with the process of FIG. 4. The process is entered at step 72 with the playback platform determining the rate streams supported by a compressed video segment. Next, with execution of step 74 the playback platform determines the lowest rate stream present in the video segment. At step 76 the playback platform determines the fastest rate stream which is supported by a decompressor process on the playback platform. At this point decompression can begin.

With execution of step 78 the playback platform decompresses the initial frame from the compressed video sequence. Next, at step 80 the decompressed initial frame is stored to memory as the initial base frame. Next, with execution of step 82, the next difference frame from the compressed video sequence which is in the selected rate stream is recovered. Identification of a frame as being in a rate stream may be based on the periodic location of such frames in the overall sequence. In other words if 30 and 15 frame per second scalability is supported, and the playback platform is utilizing 15 frame per second reproduction, only every other difference frame is retrieved. In step 84 the delta or difference frame and the base frame are summed and are written to a display device to update the display (step 84). With execution of step 86 it is determined if the difference frame just retrieved was the last in the overall sequence. If YES the process is exited by the NO branch. If the difference frame was not the last frame in the compressed sequence, the NO branch is followed to step 88 where it is determined if the difference frame belongs to the lowest stream rate. If the frame does not belong to the lowest rate stream, the NO branch is followed back to step 82. Otherwise the YES branch is followed to step 90 where the old base frame and the current difference frame are summed and the base frame is set equal to that sum. The process then returns to step 82.

As stated above, a disadvantage of the foregoing process is that display memory cannot be used. The playback process must hold on to base frames for ever longer periods as slower and slower playback rates are supported by the compressed stream. In order to relieve the decompressor of the requirement to save the base frame of a two frame comparison for multiple frame periods, a method of compression allowing playthrough is provided.

Figure 7:
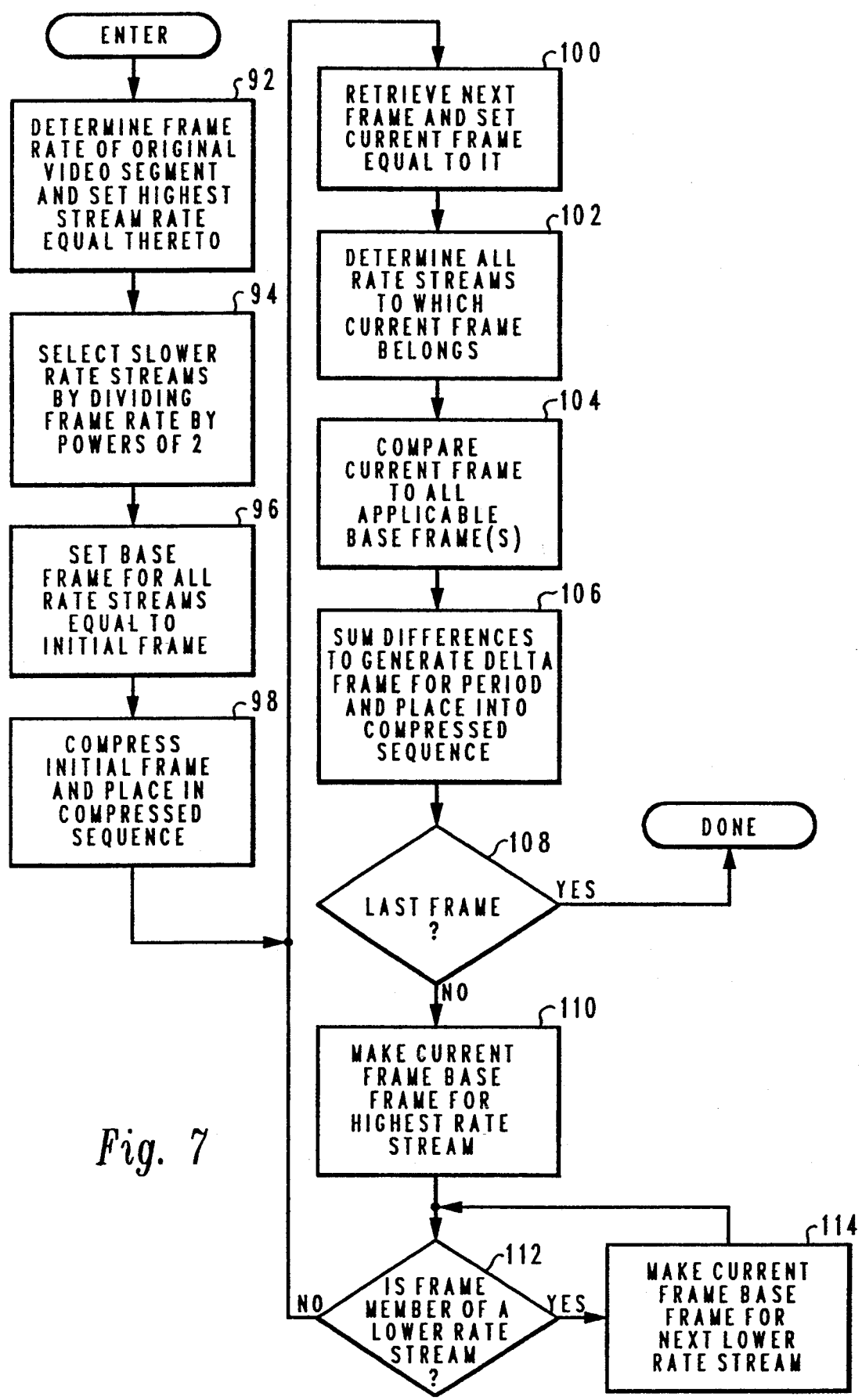
FIG. 7 is a logical flow chart for a process for compressing video data in accordance with a second embodiment of the invention.

FIG. 7 is a logical flowchart of a process for encoding video data in accordance with the second embodiment of the invention. The process is entered at step 92 where the frame rate of the original video segment is determined. The highest stream rate is set equal to that frame rate. Next, with execution of step 94, reduced rate rate streams are selected by dividing the original frame rate by powers of two. In step 96 base frames are set for all rate streams to the initial frame of the original video segment. Next, with execution of step 98, the initial frame is compressed using spatial compression techniques and placed into a compressed sequence. Next, step 100 is executed to retrieve the next frame in the original sequence and to set the current frame for compression equal to it. In step 102 it is determined to which rate streams the current frame belongs. In step 104, the current frame is compared to all applicable base frames. Applicable base frames are the base frames for all rate streams to which the current frame belongs. In step 106 difference data generated by the comparisons of step 104 are summed to generate a delta or difference frame for the period. The difference frame is then placed into the compressed sequence. Next, with execution of step 108 it is determined if the last frame of the original video segment has been processed. If YES, the process is completed. If NO, step 110 is executed to make the current frame the base frame for the highest rate stream. In step 112, it is determined if the current frame is a member of the next lower rate stream. If YES, the current frame is made the base frame for the next lower rate stream in step 114. Step 112 is then executed again to determine if the current frame is a member of a still lower rate stream. Once all rate streams have been tested or a rate stream is found to which the frame does not belong, the process is returned to step 100 for retrieval of the next frame.

FIG. 8 is a schematic illustration of the video compression process set forth in FIG. 7. The compression process, starting with frame 3, of sequence 118, compares each odd frame with both an immediately preceding even frame as well as the next previous odd frame. The results of both comparisons are then coded and stored. Starting with the fifth frame ($F_5$) every subsequent fourth frame from sequence 118 is compared to the preceding even frame and the next two preceding odd frames, e.g. for F5 the comparison is to F4, F3 and F1. The difference frame is generated and stored in a compressed video sequence 120. Upon playback every difference frame may be recovered, every other frame may be recovered or every fourth frame may be recovered. Video buffer memory, containing the state of the decompressed stream, can be used during the reconstruction phase at any playback rate and thus no additional hold buffer is required.

Figure 9:
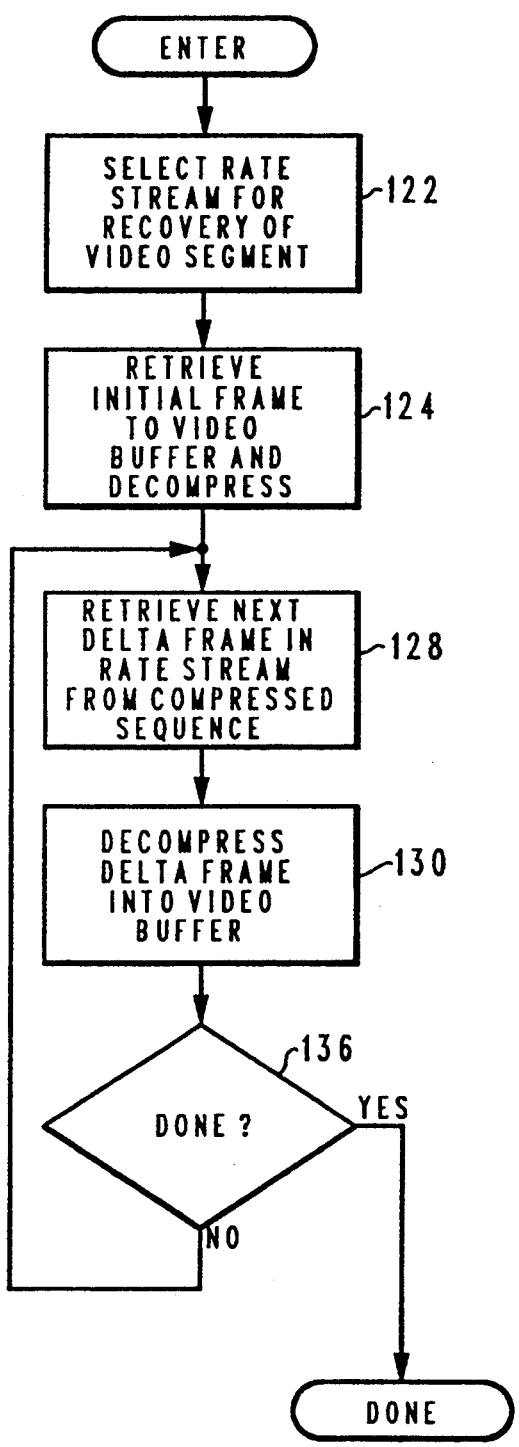
FIG. 9 is a logical flow chart for a process for decompressing video data in accordance with the second embodiment of the invention.

Decompression of a data stream encoded by the method of FIG. 7 is illustrated in reference to FIG. 9. The process is entered at step 122 where a rate stream supported by the video segment is selected for reproduction. Next, with execution of step 124 the initial frame from the compressed sequence is retrieved, usually directly into video buffer 36, or less usually into system memory 26, where it is decompressed. Then step 128 is executed to retrieve the next difference frame in the selected rate stream from the compressed sequence. At step 130, the difference (delta) frame is decompressed directly into the display frame in video buffer 26, if present. Step 136 is executed to determine if the last frame for a video segment has been executed and if YES the process is exited. Otherwise the NO branch is followed back to step 128.

Figure 10:
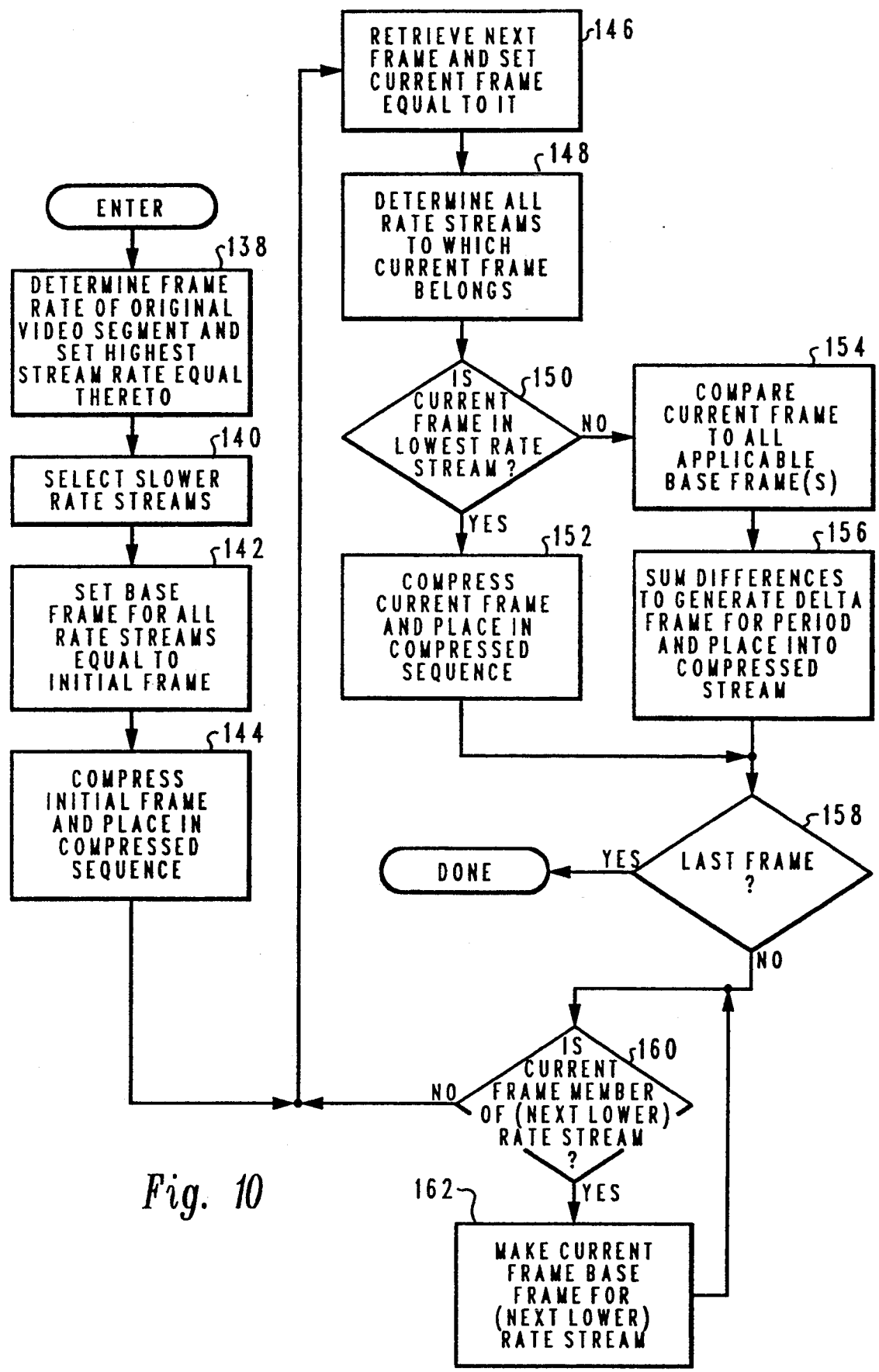
FIG. 10 is a logical flow chart for a process for compressing video data in accordance with a third embodiment of the invention.

If some of the multiple comparison difference frames of the foregoing process are replaced with intraframes, i.e. spatially compressed representation of frames from the original video signal, the same effect is achieved, i.e. playthrough without a hold buffer. In addition random access into the compressed stream is supported at each intraframe. FIG. 10 is a logical flowchart for a process of compressing video data in accordance with the third embodiment to the invention which utilizes such intraframes. The process is entered at step 138 where the frame rate of the original video segment is determined and the highest stream rate is set equal thereto. At step 140 slower rate streams are selected. The slowest rate stream is the intraframe rate. As seen from FIG. 11, the slower rate streams are not required to be derived by dividing the highest rate stream by a power of 2. At step 142 a base frame is set for all rate streams which equals the initial frame of the original video data. In step 144 the initial frame is compressed as the first intraframe and is placed into the compressed sequence.

With execution of step 146 the next frame in the original video segment is retrieved and the current frame is set equal to that frame. Then, with execution of step 148, it is determined to which rate streams the current frame belongs. In step 150 it is determined if the current frame is in the lowest rate stream. If YES, step 152 is executed to spatially compress the current frame and to set all base frames for all rate streams equal to that frame. The compressed frame is placed into the compressed sequence and the process advances to step 158. If the current frame did not belong to lowest rate stream the NO branch is followed to step 154 where the current frame is compared to all applicable base frames. In step 156, the differences from the comparisons of step 154 are summed to generate a delta or difference frame for the period and the result is placed in the compressed stream. Again step 158 is reached which determines if the last frame has been processed. If the last frame has been processed, the method is exited along the YES branch. If the last frame has not been processed, the NO branch is followed to step 160 where membership of the current frame in rate streams is determined. Each rate stream beginning with the highest is checked in turn until all rate streams are exhausted or a rate stream to which the current frame does not belong is identified. As long as the frame belongs to a rate stream the YES branch is followed from step 160 to step 162 where the current frame is made the base frame for the rate stream under evaluation. From step 162 we return to the evaluation of step 160 to determine if the current frame is a member of the next lower rate stream. When a rate stream is reached which the current frame is not a member of, or all rate streams have been exhausted, the NO branch is followed from step 160 back to step 146.

FIG. 11 is a schematic illustration of the video compression process set forth with reference to FIG. 10. A sequence of time periods 164 is correlated with a sequence of video frames from an original video sequence 166 and compression frames from a compression sequence 168. The pattern illustrated in FIG. 11 supports four frame rates. Where the time period between T1 and T2 is 1/30 of a second those frames rates are 30 frames per second, 15 frames per second, 10 frames per second and 5 frames per second.

Figure 12:
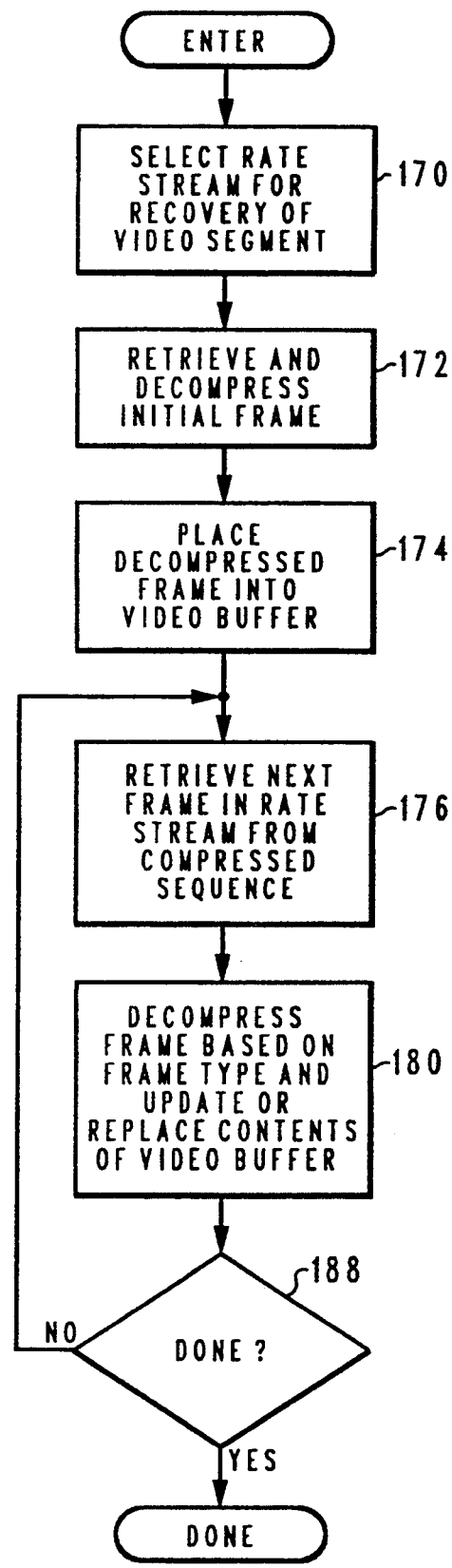
FIG. 12 is a logical flow chart for a process for decompressing video data in accordance with the third embodiment of the invention.

The decompression algorithm is set forth with reference to FIG. 12. A playback platform enters the process with execution of step 170 and selection of a rate stream for recovery of a video segment. In step 172 the initial frame is retrieved and decompressed. Next, with execution of step 174 the decompressed frame is placed into a video buffer, if available.

Subsequent retrieved frames may be decompressed and added to the frame in the video buffer. With execution of step 176 the next frame in the selected rate stream from the compressed sequence is retrieved. Next, with execution of step 180, the retrieved frame is decompressed. The decompression process may depend on whether the frame is a difference frame or an intraframe. Update (or replacement) of the frame in video buffer 26 occurs concurrently with decompression. Display of the frame is done by the playback platform from the frame in the video buffer. At step 188 it is determined if the last frame has been decompressed. If YES, the process is exited. If NO, the process is returned to step 176.

A significant advantage of the present invention is that it provides portability of a compressed video segment between heterogeneous playback platforms. Such playback platforms can include a computer based on an 8086/88 type of microprocessor running at 8 to 10 megahertz, or a more contemporary machine based on higher powered microprocessors and running at much higher clock speeds. Frame rate scalability allows the lower end machine to select a frame rate which its processing capabilities can meet in real time. More capable machines can access more data to produce a higher quality image.

While the invention has been particularly shown and described with reference to a preferred embodiment, it will be understood by those skilled in the art that various changes in form and detail may be made therein without departing from the spirit and scope of the invention.

What is claimed is:

1. A method of compressing original video data expressed in a plurality of digitally coded frames to enable decompression and playback of resulting compressed video data at one of a plurality of frame rates while maintaining temporal fidelity of the frames displayed, the method comprising the steps of:
   selecting a plurality of rate streams for the resulting compressed video data, including a highest rate stream including all of the frames of the original video data and a lowest rate stream including a subset of regularly spaced frames of the original video data;
   spatially compressing one of the frames from the original video data as a base frame for all of the rate streams and placing the resulting compressed base frame in the resulting compressed video data;
   retrieving subsequent frames from the original video data in sequence;
   applying temporal compression to each of the subsequent frames retrieved from the original video data based on comparison to the base frame for each of the rate streams to which each of the subsequent frames belongs to generate a resulting difference frame; and
   responsive to generation of the resulting difference frame, placing the resulting difference frame in the resulting compressed video data.

2. A method of compressing the original video data as set forth in claim 1, wherein the step of applying temporal compression further comprises:
   responsive to each occurrence of generation of a difference frame using a subsequent frame from the original video data belonging to the lowest rate stream, making the frame from the original video data a new base frame for all of the rate streams.

3. A method of compressing the original video data as set forth in claim 2, wherein the step of selecting the rate streams further comprises selecting intermediate rate streams, each of the intermediate rate streams including a subset of regularly spaced frames of the original video data and including all of the frames in the lowest rate stream.

4. A method of compressing the original video data as set forth in claim 1, wherein the step of applying temporal compression to the subsequent frames retrieved from the original video data further comprises generating difference data based on comparisons of each of the subsequent frames and the base frame in each of the rate streams to which the subsequent frame belongs and summing the difference data to generate the difference frame.

5. A method of compressing the original video data as set forth in claim 4, and further comprising the step of:
   subsequent to comparison of the retrieved frame to the base frame for each rate stream, making the retrieved frame the base frame for all rate streams to which the retrieved frame belongs.

6. A method of compressing the original video data as set forth in claim 5, wherein the step of selecting the rate streams further comprises selecting intermediate rate streams, each of the intermediate rate streams including a subset of regularly spaced frames of the original video data and including all of the frames in the lowest rate stream.

7. A method of compressing the original video data as set forth in claim 5, and further comprising:
   after retrieval of the frame from the original video data, determining if the retrieved frame belongs to the lowest rate stream;
   if the retrieved frame does not belong with to the lowest rate stream, continuing with the step of applying temporal compression; and
   if the retrieved frame belongs to the lowest rate stream, omitting the step of applying temporal compression and spatially compressing the retrieved frame as the base frame for all of the rate streams and placing the resulting compressed frame in the resulting compressed video data.

8. A method of compressing the original video data as set forth in claim 7, wherein the step of selecting the rate streams further comprises selecting intermediate rate streams, each of the intermediate rate stream including a subset of regularly spaced frames of the original video data and including all of the frames in the lowest rate stream.

9. A method of compressing the video data as set forth in claim 2, and further comprising: decompressing video data from the resulting compressed video data on a playback platform; and
   displaying the decompressed video data.

10. A method of compressing the video data as set forth in claim 9, wherein the step of decompressing video data further comprises the steps of:
    determining the rate streams used in generating the resulting compressed video data;
    selecting one of the rate streams for reproduction based upon fastest rate stream supported by the playback platform;
    decompressing the initial frame from the resulting compressed video data and saving the decompressed initial frame as the base frame in a memory for the playback platform;
    decompressing a next difference frame in the selected rate stream from the resulting compressed video data;
    combining the decompressed difference frame with the base frame to generate a display frame;
    determining if the decompressed difference frame belongs to the lowest rate stream;
    if the decompressed difference frame belongs to the lowest rate stream, storing the display frame in the memory as the base frame; and returning to the step of decompressing a next difference frame.

11. A method of compressing the original video data as set forth in claim 5, and further comprising:

decompressing the resulting compressed video data by,
    decompressing the initial frame,
    storing the decompressed initial frame in the memory as a display frame,
    retrieving subsequent frames from the resulting compressed video data,
    decompressing each of the subsequent frames in sequence, and
    updating the display frame with each decompressed subsequent frame.

12. A method of compressing the original video data as set forth in claim 7, and further comprising:
    decompressing the resulting compressed video data by,
        decompressing the initial frame,
        storing the decompressed initial frame in the memory as a display frame,
        retrieving a next subsequent frame from the resulting compressed video data,
        decompressing the next subsequent frame,
        determining if the next subsequent frame was spatially compressed or if the next subsequent frame is the difference frame,
        if the next subsequent frame is the difference frame, updating the display frame with the difference frame,
        if the next subsequent frame was a spatially compressed frame, making the spatially compressed frame the display frame upon decompression, and
        returning to the step of retrieving the next subsequent frame.

13. A data processing system for compressing original video data expressed in a plurality of digitally coded frames to enable decompression and playback of resulting compressed video data at one of a plurality of frame rates while maintaining temporal fidelity of the frames displayed, comprising:
    a memory for storing a base frame;
    means for selecting a plurality of rate streams for the resulting compressed video data, the rate streams including a highest rate stream having all of the frames in the original video data and a lowest rate stream having a subset of regularly spaced frames in the original video data;
    means for placing one of the frames from the original video data in the memory means as a base frame for all rate streams;
    means for spatially compressing the base frame and placing a resulting compressed frame in the resulting compressed video data;
    means for retrieving subsequent frames from the original video data in sequence;
    means for applying temporal compression to the subsequent frames retrieved from the original video data based on comparison to the base frame for each of the rate streams to which the subsequent frames belong to generate a plurality of resulting difference frames; and
    means for placing the resulting difference frames in the resulting compressed video data.

14. A data processing system as set forth in claim 13, wherein the means for applying temporal compression further comprises:
    means responsive to generation of a difference frame using a subsequent frame from the original video data belonging to the lowest rate stream for making the subsequent frame from the original video data the base frame for all of the rate streams.

15. A data processing system as set forth in claim 14, wherein the means for selecting the rate streams further comprises means for selecting intermediate rate streams, each of the intermediate rate streams including a subset of regularly spaced frames of the original video data and including all of the frames in the lowest rate stream.

16. A data processing system as set forth in claim 13, wherein the means for applying temporal compression to the subsequent frames retrieved from the original video data further comprises means for generating difference data based on comparisons of each of the subsequent frames and the base frame in each of the rate streams to which the subsequent frame belongs and means for combining the difference data to generate the difference frame.

17. A data processing system for compressing original video data as set forth in claim 16, and further comprising:
    means responsive to comparison of the subsequent frame to the base frames for each rate stream to which the frame belongs for making the frame the base frame for all rate streams to which the subsequent frame belongs.

18. A data processing system for compressing original video data as set forth in claim 17, wherein the means for selecting the rate streams further comprises means for selecting intermediate rate streams, each of the intermediate rate streams including a subset of regularly spaced frames of the original video data and including all of the frames in the lowest rate stream.

19. A data processing system for compressing original video data as set forth in claim 17, and further comprising:
    means responsive to retrieval of the subsequent frame from the original video data for determining if the subsequent frame belongs to the lowest rate stream; and
    means responsive to the subsequent frame belonging to the lowest rate stream for spatially compressing the subsequent frame as the base frame for all of the rate streams and for placing the resulting compressed base frame in the resulting compressed video data.

20. A data processing system as set forth in claim 19, wherein the means for selecting the rate streams further comprises means for selecting intermediate rate streams, each of the intermediate rate stream including a subset of regularly spaced frames of the original video data and including all of the frames in the lowest rate stream.

21. A data processing system as set forth in claim 14, and further comprising:
    a playback platform for decompressing video data; and
    means for displaying the decompressed video data.

22. A data processing system as set forth in claim 21, wherein the playback platform further comprises:
    a memory;
    means for accessing the resulting compressed video data;
    means for determining the rate streams used in generating the resulting compressed video data;
    means for selecting one of the rate streams for reproduction based upon fastest rate stream supported by playback platform;
    means for decompressing the initial frame from resulting compressed video data and saving the decompressed initial frame as the base frame in the memory;

means for decompressing a next difference frame in the selected rate stream from the resulting compressed video data;

means for combining the decompressed difference frame with the base frame to generate a display frame;

means for determining if the decompressed difference frame belongs to the lowest rate stream; and means responsive to the decompressed difference frame belonging to the lowest rate stream for storing the display frame in the memory as the base frame.

23. A data processing system as set forth in claim 21, wherein the playback platform further comprises:

a memory;

means for decompressing the initial frame;

means for storing the decompressed initial frame in the memory as a display frame;

means for retrieving subsequent frames from the resulting compressed video data;

means for decompressing each of the subsequent frames in sequence; and means for updating the display frame with each decompressed subsequent frame.

24. A data processing system as set forth in claim 23, wherein the memory includes a video buffer for storage of the display frame.

25. A data processing system as set forth in claim 21, and further comprising:

a memory;

means for decompressing the initial frame;

means for storing the decompressed initial frame in the memory as a display frame;

means for retrieving a next subsequent frame from the resulting compressed video data;

means for decompressing the next subsequent frame;

means for determining if the next subsequent frame was spatially compressed or if the next subsequent frame is the difference frame;

means responsive to the next subsequent frame being the difference frame for updating the display frame with the difference frame; and means responsive to the next subsequent frame having been a spatially compressed frame for storing the next subsequent frame as the display frame upon decompression.

* * * * *